C. J. MARSHALL.
STOCK FEEDER FOR WOODWORKING MACHINES.
APPLICATION FILED MAY 20, 1920.

1,355,491.

Patented Oct. 12, 1920.

Inventor
Charles J. Marshall,
By Cromwell, Greist & Warden
Attys.

C. J. MARSHALL.
STOCK FEEDER FOR WOODWORKING MACHINES.
APPLICATION FILED MAY 20, 1920.

1,355,491.

Patented Oct. 12, 1920.

C. J. MARSHALL.
STOCK FEEDER FOR WOODWORKING MACHINES.
APPLICATION FILED MAY 20, 1920.

1,355,491.

Patented Oct. 12, 1920.

Witness:
Geo. E. Davison

Inventor:
Charles J. Marshall,
By Cromwell, Greist & Warden
Attys.

UNITED STATES PATENT OFFICE.

CHARLES J. MARSHALL, OF BELOIT, WISCONSIN, ASSIGNOR TO P. B. YATES MACHINE COMPANY, OF BELOIT, WISCONSIN, A CORPORATION OF WISCONSIN.

STOCK-FEEDER FOR WOODWORKING-MACHINES.

1,355,491.   Specification of Letters Patent.   Patented Oct. 12, 1920.

Application filed May 20, 1920. Serial No. 382,705.

*To all whom it may concern:*

Be it known that I, CHARLES J. MARSHALL, a citizen of the United States, residing at Beloit, in the county of Rock and State of Wisconsin, have invented certain new and useful Improvements in Stock-Feeders for Woodworking-Machines, of which the following is a specification.

The present invention has for its object the provision of a machine for feeding stock material to wood-working machines of whatever character, whether planers, matchers or what not.

The invention is especially adapted to the difficult field of feeding mill-run material including that which is rough, nonuniform in size and crooked, or otherwise distorted as to shape as well as to the feeding of stock material of select quality.

In most mills there is turned out a large amount of material which by reason of misshapen character is unsuited for handling in the ordinary way, and for this reason it is culled out and amounts substantially to waste. Much of such material is sound and inherently valuable and could be used in many situations were it not for the difficulty in handling the same.

Means have been devised for more or less successfully working cull stock, but it has been difficult and expensive to feed such material in a way to present the same to the machine so as to secure good results therefrom.

It is for meeting such a situation as this, in addition to the handling of standard quality of stock that the present invention has been devised to the end that mills provided with a machine embodying the invention shall be enabled to utilize the very largest proportion of their sound material both straight and crooked, thus reducing waste to a minimum and securing a product of the greatest uniformity and of the best quality.

To most efficiently feed and work such mill-run stock it is found that it is best presented to the milling or matching machine on edge as distinguished from its side, and the present machine is especially designed to handle the stock on edge.

In order that the salient features of the invention may be most readily understood a preferred embodiment of the same is set forth in the accompanying drawings and the following detailed description predicated thereon. The invention being susceptible of embodiment in varied constructional forms without departure from the essence thereof or a material sacrifice of its advantages, it is to be understood that the drawings and description are to be taken by way of exemplification and not in an unnecessarily limiting sense.

Having reference to the drawings in detail, the machine frame is illustrated as comprising standards 11 with longitudinal members 12 and cross members 13, said frame having suitably journaled therein transmission shafts 14, 15, 16, 17, 18 and 19 disposed in substantially parallel relation longitudinally of the frame. A drive shaft 20 and a driven shaft 21 are likewise journaled in the machine frame transversely thereof, the drive shaft being driven by means of a pulley 23 from a suitable source of power, in turn driving the shaft 21 by means of a belt 24 engaging the pulley 25, the belts of the drive and driven pulleys being maintained taut by suitably disposed belt tighteners 26 and 27. The transmission shaft 14 is driven from the shaft 21 by means of bevel gears 28, 29 and said shaft 14 in turn drives the shaft 16 by a series of sprocket chains 30 traversing a series of sprocket wheels 31 on the shaft 14 and corresponding sprocket wheels 32 on the shaft 16. The chains 30 are held taut by means of gravity tightening rolls 33 pivoted at 34 and weighted at 35. It will be observed that the left hand reach of the chains 30 as viewed in Figs. 3 and 4 extends in a substantially vertical direction, the slack of said chains being taken up by the tightening rolls 33 at the right hand side.

Figure 3:
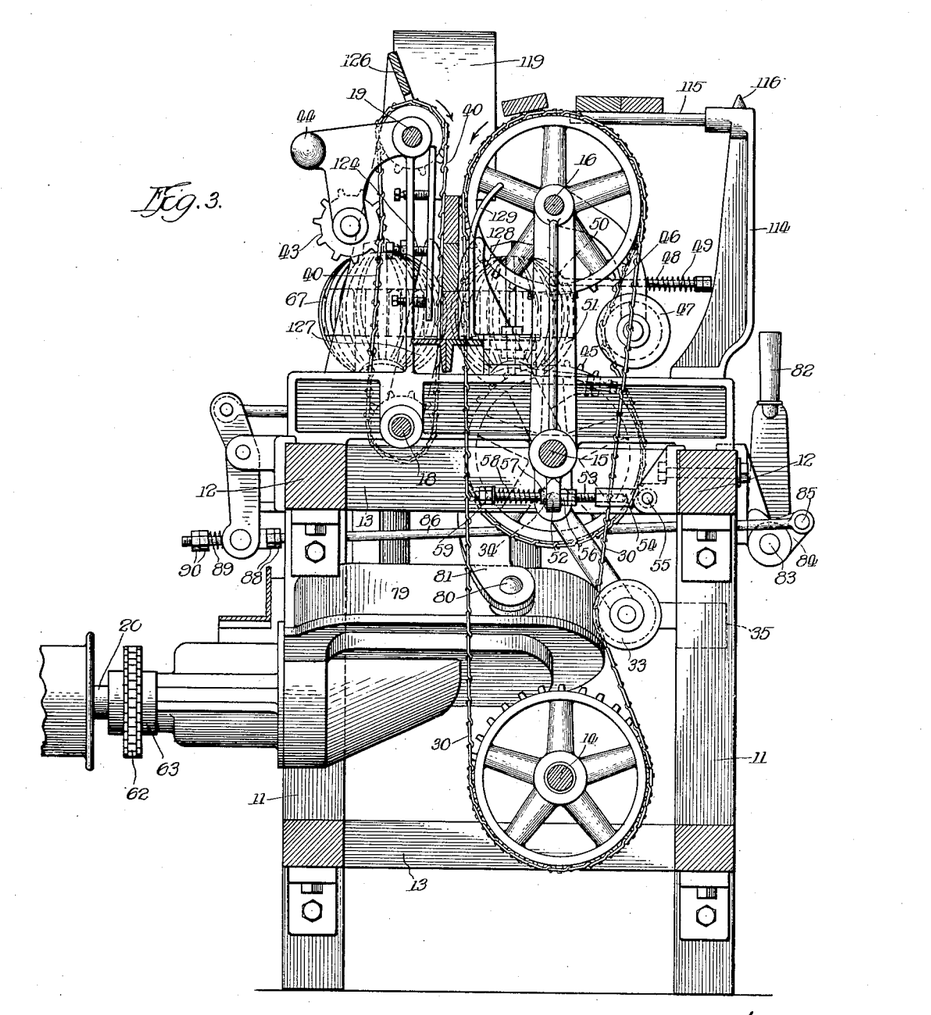
Fig. 3 is a transverse section on the line 3—3 of Fig. 1.
Figure 4:
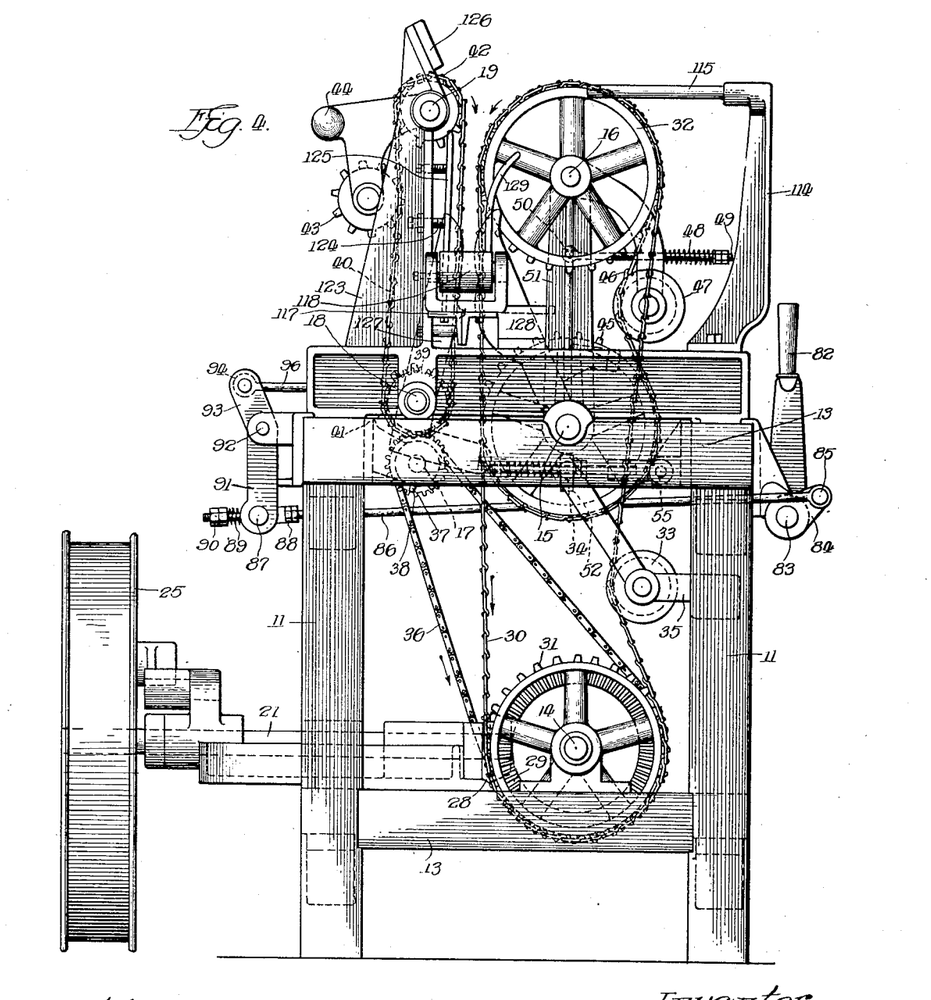
Fig. 4 is a front end view of the machine.

Having reference to Fig. 4 of the drawing the shaft 17 is driven from the sprocket 31 by means of the sprocket chain 36 traversing the sprocket 37. Power is transmitted from the shaft 17 to the shaft 18 by means of the pinions 38, 39 and power is transmitted from the shaft 18 to the shaft 19 by means of the chain 40 traversing the sprocket 41 on the shaft 18 and the sprocket 42 on the shaft 19. The chain 40 is maintained taut by means of the tightener roll 43 swung from the shaft 19 as a pivot and counterweighted at 44. It will be observed that as viewed in Figs. 3 and 4 the right hand reach of the chain 40 extends in a substantially vertical right-line in opposition to the vertical reach of the chain 30 and at but a slight distance therefrom, the slack of the chain 40 being taken up at the left hand side.

Near the forward end of the stock feeder and in order to provide clearance for other parts of the machine there disposed the shaft 41 terminates, and the shaft 15 serves to carry a sprocket 45 traversed by a shorter chain 46 which engages above one of the sprockets 32 of the shaft 16. The inner reach of this chain extends in the same plane longitudinally viewed as does the inner reach of the chains 30 while the outer reach of the chain 46 is tightened by means of a roll 47 which is pressed against the chain by means of a spring 48 mounted upon the rod 49 pivoted at 50 to the vertical standard 51.

The standard 51 is one of a longitudinal series the upper ends of which serve as journal mountings for the shaft 16 and the lower ends of which are pivoted upon the shaft 15 and extend for a short distance below the shaft 15 terminating in studs 52 transversely bored. A series of screw spindles 53 are adjustably threaded into sleeves 54 pivoted at 55 to the machine frame, and provided with jam nuts 56 against which the studs 52 of the standards 51 abut to limit the outward swing of the stud and consequently the inward swing of the upper ends of the standards and the shaft 16. Upon the screw spindles 53 opposite the jam nuts 56 are disposed loose collars 57 forming inner abutments for springs 58 disposed between the collars 57 and jam nuts 59 on the free ends of the screw spindles. By this arrangement the upper ends of the standards, the shaft 16, the sprockets 32 and the chains 30 and 46 may yield outwardly to the right as viewed in Figs. 3 and 4 and away from the chains 40 upon the sprockets 41 and 42; all for a purpose which hereinafter will be made clear.

Transversely journaled in the machine frame forwardly of the drive shaft 20 is a countershaft 60 driven by a sprocket 61 mounted thereon by means of a chain 62 traversing a sprocket 63 on the drive shaft 20. This countershaft 60 carries a bevel pinion 64 in mesh with a companion bevel pinion 65 carried by a vertical shaft 66 fixedly journaled in the frame and having mounted upon its upper end a stock forwarding roll 67 having a ribbed or otherwise roughened periphery 68.

The shaft 20 carries a bevel pinion 69 in mesh with a companion bevel pinion 70 upon a shaft 71 which is fixedly disposed at an inclination to the vertical and provided at its upper end with a spherical stock feeding head 72 having a roughened surface formed by meridian ribs 73.

The stock feeding roll 67 and the stock feeding head 72 are disposed in alinement viewed longitudinally of the machine with the right hand or inner faces in the same vertical plane, which plane corresponds substantially with the plane of the inner reach of the chains 40, and marks the left hand boundary of the line of travel of the stock through the machine.

As a companion member to the feed roll 67 but yieldingly mounted with reference thereto, is a feed roll 67$^a$ having a similar roughened face 68$^a$ carried by a substantially vertical shaft 66$^a$. The two shafts 66 and 66$^a$ have mounted thereon at their lower ends companion pinions 74, 74$^a$ by means of which the feed roll 67$^a$ is driven in unison with the feed roll 67 but in an opposite direction. The bevel pinions 64, 65 and the pinions 74, 74$^a$ are mounted within a housing 75, transfixed by a pivot 76 engaged by a yoke member 77 carrying the upper journal 78 of the shaft 66$^a$, in order to permit of the tilting of the shaft 66$^a$ about the pivot 76 and thus vary the distance between the stock feeding rolls 67 and 67$^a$ in the manner to be later described. Alongside the shaft 71 of the stock feeding head 72 is a companion shaft 71$^a$ and head 72$^a$ driven in a similar manner to that of the stock feeding rolls, the driving pinions being contained within the housing 79 and the shaft 71 being similarly pivoted at 80 by means of a yoke 81.

The yielding stock feed roll 67$^a$ and the yielding stock feed head 72$^a$ are so mounted as to be manually operable in unison to positively move them away from the companion fixed roll and head and to permit of independent yielding, in the manner following.

Figures 2, 8:
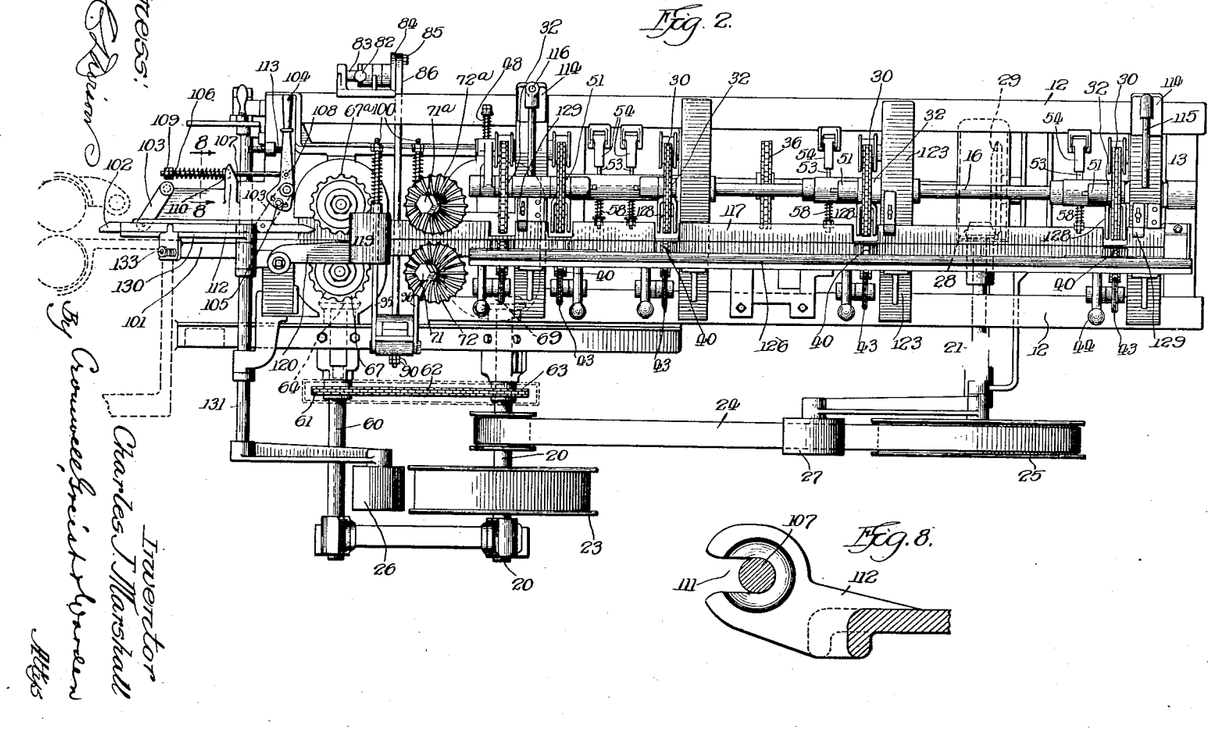
Fig. 2 is a top plan view of the same.
Fig. 8 is an enlarged detail section on the line 8—8 of Fig. 2.
Figures 6, 7, 9:
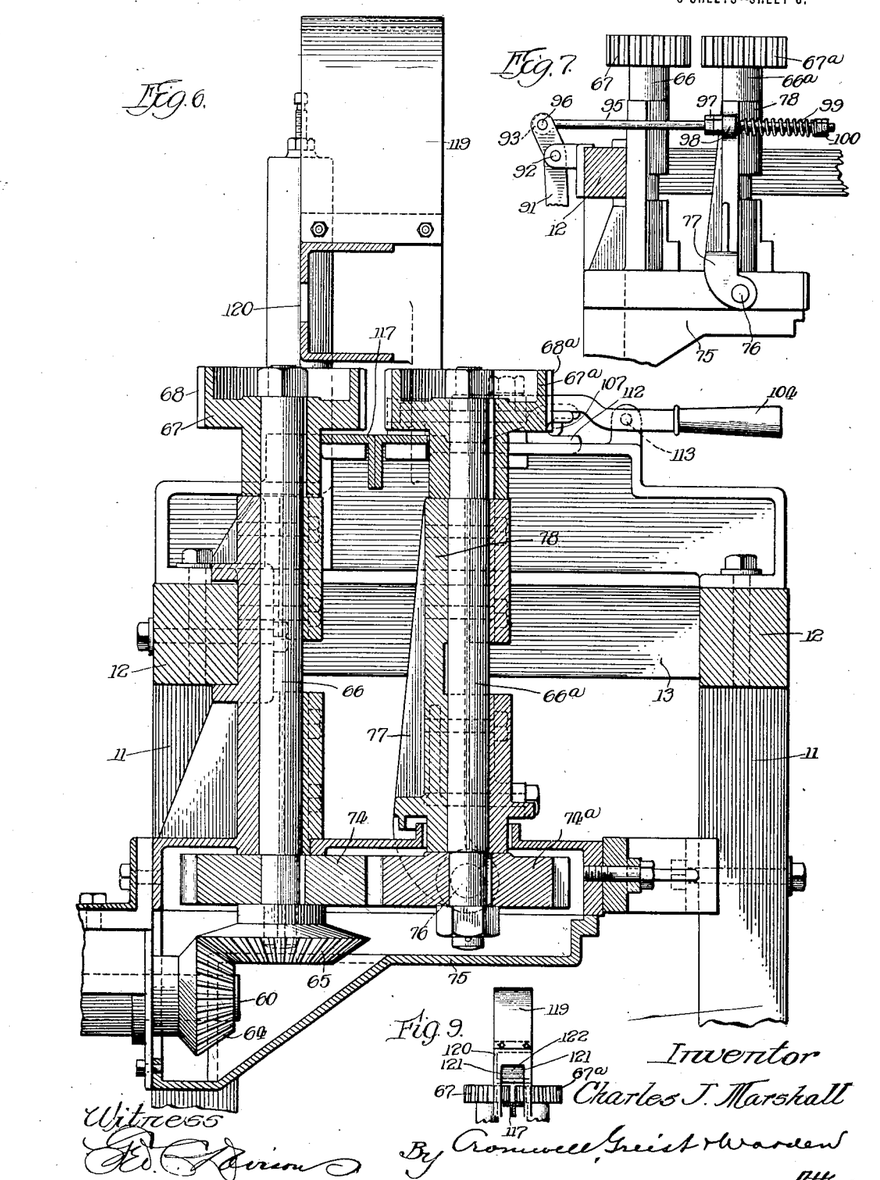
Fig. 6 is an enlarged sectional view on the line 6—6 of Fig. 1.
Fig. 7 is a detail view illustrating the mounting of the forwarding rolls.
Fig. 9 is a fragmentary rear elevation of the directing and excluding plate.

Having particular reference to Figs. 2, 3, and 7 it will be observed that a hand lever 82 is connected to the rock shaft 83 carrying a rock arm 84 having attached thereto at 85 a link 86 extending across the machine frame and through a coupling member 87 to which a yielding connection is made by means of the jam nuts 88, spring 89 and the adjusting nuts 90. The coupling member 87 is in the arm 91 of a lever fulcrumed at 92, the upper arm 93 of the lever terminating in a cross head 94 which connects the ends of two links 95, 96. The link 95 provided with the jam nuts 97 which bear upon one side of a boss 98 of the journal boxing 78 of the yielding stock feed roll $67^a$ while the link extends through said boss and is encircled by a spring 99 confined between said boss and the adjusting nuts 100. The link 36 is similarly connected with the shaft $71^a$ of the stock feeding head $72^a$.

In advance of the stock feed rolls and heads a fixed guide 101 is disposed with its inner face in substantially the same longitudinal vertical plane as the inner faces of the fixed stock feed roll and stock feed head. Opposite the fixed guide 101 is a yielding guide 102 carried by links 103 by which a parallel motion is imparted thereto. A hand lever 104 is adjustably connected to one of the links 103 by means of a segment slot and set screw 105, in order that by said lever the yielding guide 102 may be moved toward or away from the fixed guide 101. The guide 102 is yieldingly pressed toward the fixed guide 101 by means of a spring 106 mounted upon detent 107 connected to the lever at 108, said spring being disposed between adjusting nuts 109 and a collar 110 which engages within a bifurcated portion 111 of a standard 112. While by this means the yielding guide is normally spring-pressed toward the fixed guide, it may be moved away from said guide by means of a hand lever against the tension of the spring, or it may be quickly released in case of emergency or for purposes of adjustment by pushing the detent rod 107 to one side so as to disengage the collar 110 from the notch 111 of the standard 112. The extent to which the guide 102 may approach the guide 101 is limited by an adjustable stop 113 disposed in the path of the lever 104. At the right hand side of the machine viewed as from the rear, standards 114 are provided with overhanging arms 115 to facilitate the delivery of stock to the feeder by the man in charge. The forward standard may efficiently be provided with a spur 116 upon which to fulcrum the timber and prevent its slipping as it is elevated into place. As the strips of material accumulate on the bracket arms 115 they are pushed toward the left until their under-faces are engaged by the chains 30 whereupon they are carried to the left by the chains and dropped into the guide space between the chains 30 and 40. The boards tend to descend into the guide space by gravity and are assisted against any minor obstructions by the downward travel of the chains 30 and 40 by which the side walls of the channel are formed. The bottom of the channel is formed by a metal rail 117 which is substantially horizontal and horizontally alined with the space between the pairs of stock feed rolls and heads and also with the space between the fixed and yielding guides at the forward end of the machine. At the rear end there is advantageously mounted above the rail 117 antifriction rail 118 to receive and support the rear end of exceptionally long pieces of stock delivered into the guide channel.

Figure 1:
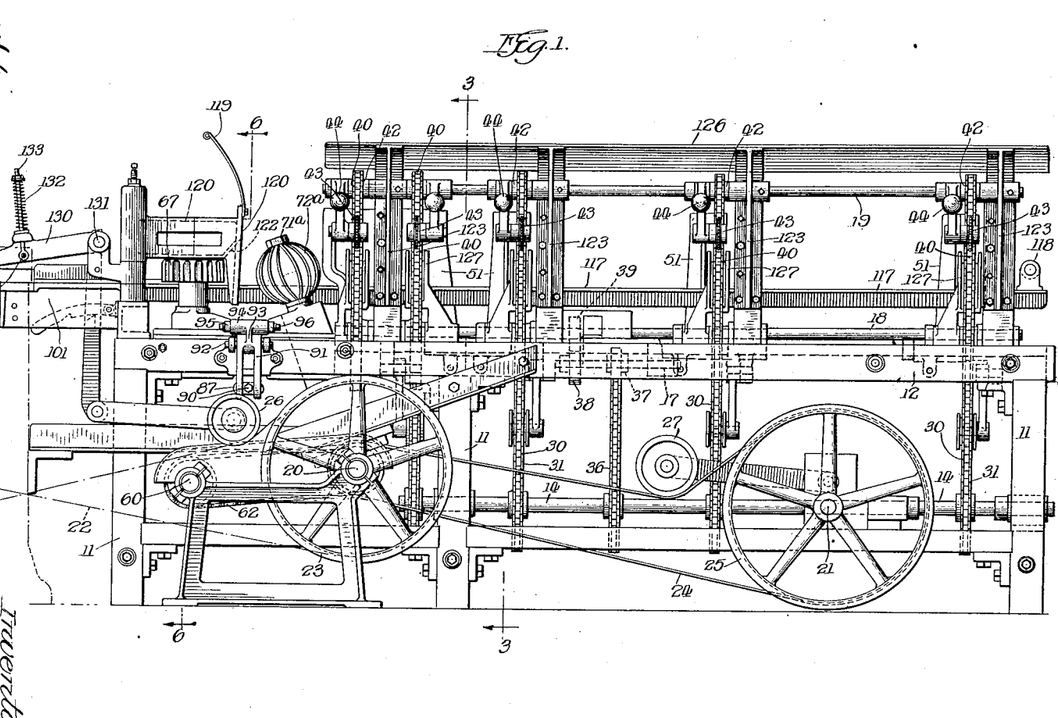
Figure 1 is a side elevation of a stock feeder embodying the invention.
Figure 5:
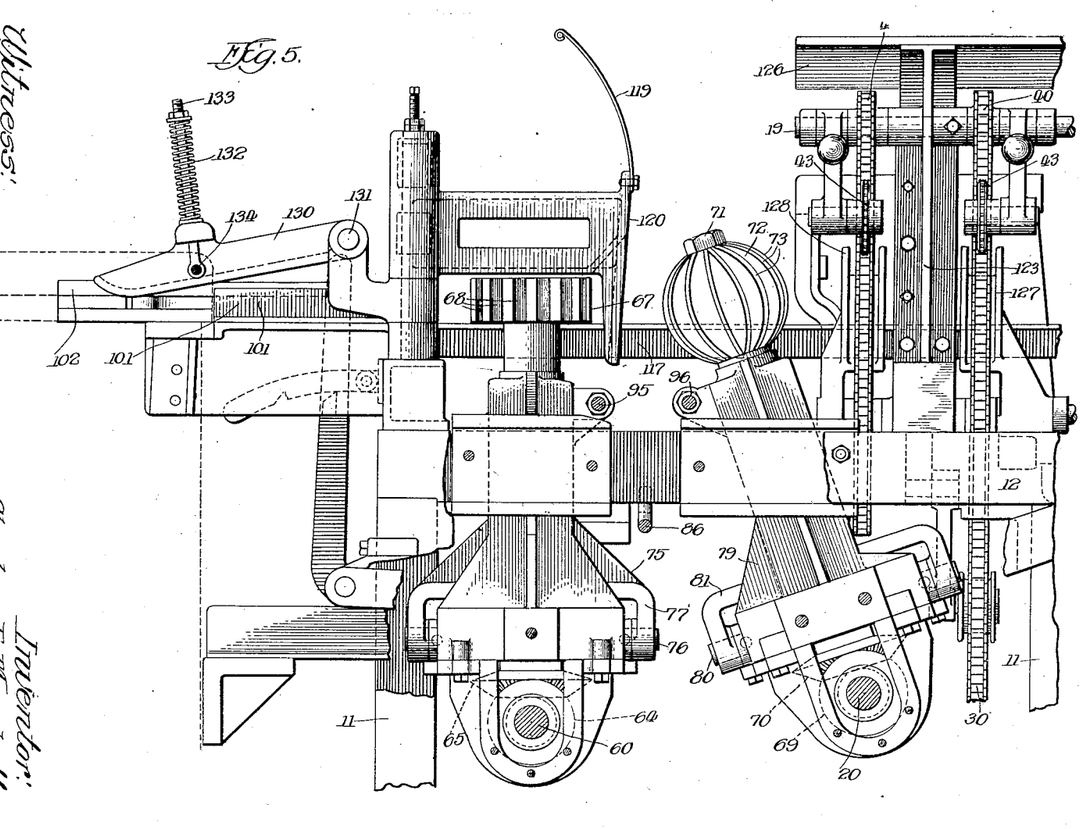
Fig. 5 is a fragmentary view of the forward end of the machine upon a somewhat enlarged scale.

At a point preferably in advance of the stock feed heads 72, $72^a$ and at the rear of the stock feed rolls 67, $67^a$ is arranged a deflector plate 119 inclined downwardly and to the rear as shown in Figs. 1 and 5 so that if stock is delivered to the machine in advance of its proper position it will be deflected backwardly by the plate 119 and its front end pushed back to the rear of the plate 119 and a directing and excluding plate 120 to the upper edge of which the deflector 119 is secured.

As will be seen from Figs. 6 and 9 the rear face of the directing and excluding plate 120 is cut away at 121 at a point corresponding to the space between the stock feed rolls 67 and $67^a$, the upper wall of the opening 121 being inclined downwardly and to the front as indicated at 122, in order that any material wider than the height of the opening 121 will be excluded and that material sufficiently narrow will be guided downwardly by the inclined wall 122 to insure contact between the lower edge of the material and the track 117.

The stock material having been fed into the guide channel between the chains 30 and 40 is fed downwardly by said chains until its forward end is engaged by the spherical stock feeding heads 72, $72^a$. The axis of rotation of these heads being inclined to the vertical they tend to feed the stock both downwardly and forwardly. As soon as the stock contacts with the rail 117 the action of the stock feeding heads is to hold the stock firmly upon the rail and at the same time to forward it to the stock feeding rolls.

At the left hand side of the machine viewed from the rear the standards 123 which carry the shaft 19 are themselves disposed at one side of the vertical reach of the chain 40 and have adjustably mounted thereon by means of the screws 124 guide plates 125 which serve as guiding abutments for the stock in case of excessive warping which would press the chains out of vertical alinement.

Upon the upper ends of the standards 123 and longitudinally connecting the same is a deflector rail 126 to prevent a piece of stock material roughly handled from over-riding the machine and to guide the same back into the guide channel.

It might happen with rough material that boards fed longitudinally through the channel between the chains might have slivered portions which would catch on the chains and under the forwarding impulse of the feed rolls pull the chains out of their vertical path. To safeguard against this, arms 127 and 128 are provided which receive between themselves the boards fed downwardly by the chains and present smooth friction surfaces between which the boards will slide. These arms may be both advantageously spring mounted so as to yield, or one of them may be fixed and the other yieldingly mounted as shown, the arm 128 is mounted upon the shaft 15 which is under the control of the spring 58 in which case the arm 128 will give and take with the standard 51. To insure that the material will enter between the arms 127 and 128 a deflector blade 129 may additionally be used.

In advance of the stock feeding rolls and the directing and excluding device and in close working proximity to the fixed and yielding guides is advantageously arranged a hold-down shoe 130 shown as pivoted at 131 and yieldingly forced down upon the material by means of the spring 132 mounted upon the rod 133 which has a fixed mounting at 134. This hold-down shoe may form a part of the stock feeder or of the wood-working machine to which the stock is fed.

It will be observed that by the machine hereinbefore described stock material varying considerably as to thickness and breadth as well as length, may be fed to any type of wood-working machine; also that even though such material may be warped and crooked it will be presented to the feed heads and rolls and by them between horizontal and vertical guides in proper relation to the machine.

I claim:

1. In a stock feeder for wood-working machines, a machine frame, a horizontal track alined with the machine to be fed, downwardly moving opposed belts forming therebetween a guide channel having yielding side walls above the track of a width to frictionally receive the stock, forwarding means for frictionally engaging the stock to urge the same forward within the channel, and a directing member at the discharge end of the machine.

2. In a stock feeder for wood-working machines, a machine frame, a horizontal track, downwardly moving opposed chain belts forming therebetween a guide channel above the track having yielding side walls of a width to frictionally receive the stock on edge, means for frictionally engaging the stock and urging the same forwardly and downwardly in the guide channel, a directing member at the discharge end of the channel, and means to receive the stock from the channel and forward it through the directing member.

3. In a stock feeder for wood-working machines, a machine frame, a horizontal track, downwardly moving opposed chain belts forming therebetween a guide channel above the track having yielding side walls of a width to frictionally receive the stock on edge, rotating means for frictionally engaging and urging the same forwardly and downwardly within the channel, a directing member at the discharge end of the channel, stock feeding rolls to receive the stock from the directing member and deliver it to the machine to be fed, a fixed guide rail, yielding means to press the stock against the rail, and a quick-release for the yielding guide pressure means.

4. In a stock feeder for wood-working machines, a machine frame, longitudinally mounted shafting, driving connections therefor, pulleys on the shafting, belts traversing the pulleys with substantially vertical reaches, the belts arranged in pairs in transverse vertical planes, the adjacent reaches of each pair moving downwardly in substantially parallel relation and separated a suitable distance to receive the stock therebetween, a horizontal track disposed between the adjacent reaches of the belts and forming a bottom to the stock-receiving channel therebetween, forwarding means for frictionally engaging the stock while in the channel between the belts and urging the same forwardly, and a directing member at the discharge end of the machine.

5. In a stock feeder for wood-working machines, a machine frame, longitudinally mounted shafting, driving connections therefor, pulleys on the shafting, belts traversing the pulleys with substantially vertical reaches, the belts arranged in pairs in transverse vertical planes, the adjacent reaches of each pair moving downwardly in substantially parallel relation and separated a suitable distance to receive the stock therebetween, the upper pulley of one of the belts of a pair mounted to yield away from the corresponding upper belt pulley of the pair, a horizontal track disposed between the horizontal reaches of the belts and forming a bottom to the stock-receiving channel therebetween, forwarding means for frictionally engaging the stock while in the channel between the belts and urging the same forwardly, and a directing member at the discharge end of the machine.

6. In a stock feeder for wood-working machines, a machine frame, longitudinally mounted shafting, driving connections therefor, pulleys on the shafting, belts traversing the pulleys with substantially vertical reaches, the belts arranged in pairs in transverse vertical planes, the adjacent reaches of each pair moving downwardly in substantially parallel relation and separated a suitable distance to receive the stock therebetween, belt tighteners acting on the outside reaches of the belts, the upper pulley of one of the belts of a pair mounted to yield away from the corresponding upper belt pulley of the pair against adjustable resistance, a horizontal track disposed between the adjacent reaches of the belts and forming a bottom to the stock-receiving channel therebetween, yielding guide arms extending inwardly to the inner face of one of the belts, forwarding means for frictionally engaging the stock while in the channel between belts and urging the same forwardly, and a directing member at the discharge end of the machine.

7. In a stock feeder for wood-working machines, a machine frame, longitudinally mounted shafting, driving connections therefor, pulleys on the shafting, belts traversing the pulleys with substantially vertical reaches, the belts arranged in pairs in transverse vertical planes, the adjacent reaches of each pair moving downwardly in substantially parallel relation and separated a suitable distance to receive the stock therebetween, the upper pulley of one of the belts of a pair mounted to yield away from the corresponding upper belt pulley of the pair against adjustable resistance, a horizontal track disposed between the adjacent reaches of the belts and forming a bottom to the stock-receiving channel therebetween, bracket members at substantially the level of the upper belt pulley to facilitate delivery of stock to the machine over said pulley, a deflector rail at the opposite side of the pulleys, yielding guide arms extending from opposite sides inwardly to the inner faces of the belts, forwarding means for frictionally engaging the stock while in the channel between the belts and urging the safe forwardly, and a directing member at the discharge end of the machine.

8. In a stock feeder for wood-working machines, a machine frame, longitudinally mounted shafting, driving connections therefor, pulleys on the shafting, belts traversing the pulleys with substantially vertical reaches, the belts arranged in pairs in transverse vertical planes, the adjacent reaches of each pair moving downwardly in substantially parallel relation and separated a suitable distance to receive the stock therebetween, a horizontal track disposed beneath the adjacent reaches of the belts and forming a bottom to the stock-receiving channel therebetween, companion stock feed rolls on vertical axes yieldingly mounted to frictionally receive the stock therebetween and forward the same through the channel, and means to receive the stock from the feed rolls and to direct the same into the machine to be fed.

9. In a stock feeder for wood-working machines, a machine frame, longitudinally mounted shafting, driving connections therefor, pulleys on the shafting, belts traversing the pulleys with substantially vertical reaches, the belts arranged in pairs in transverse vertical planes, the adjacent reaches of each pair moving downwardly in substantially parallel relation and separated a suitable distance to receive the stock therebetween, a horizontal track disposed between the adjacent reaches of the belts and forming a bottom to the stock-receiving channel therebetween, companion stock feeding members rotatably mounted on axes inclined to the vertical to frictionally receive the stock therebetween and urge the same forwardly and downwardly in the channel, and means to receive the stock from the feeding members and direct the same into the machine to be fed.

10. In a stock feeder for wood-working machines, a machine frame, longitudinally mounted shafting, driving connections therefor, pulleys on the shafting, belts traversing the pulleys with substantially vertical reaches, the belts arranged in pairs in transverse vertical planes, the adjacent reaches of each pair moving downwardly in substantially parallel relation and separated a suitable distance to receive the stock therebetween, a track disposed between the adjacent reaches of the belts and forming a bottom to the stock-receiving channel therebetween, companion spherical stock feed heads on axes inclined to the vertical one fixed and the other yieldingly mounted to receive the stock therebetween and urge the same forwardly and downwardly in the channel, companion stock feed rolls on vertical axes one fixed and the other yieldingly mounted to receive the stock therebetween and to forward the same from the stock feed heads, and means to receive the stock from the feed rolls and direct the same into the machine to be fed.

11. In a stock feeder for wood-working machines, a machine frame, longitudinally mounted shafting, driving connections therefor, pulleys on the shafting, belts traversing the pulleys with substantially vertical reaches, the belts arranged in pairs in transverse vertical planes, the adjacent reaches of each pair moving downwardly in substantially parallel relation and separated a suitable distance to receive the stock therebetween, the upper pulley of one of the belts of a pair mounted to yield away from the corresponding upper belt pulley of the pair against adjustable spring resistance, a horizontal track disposed between the adjacent reaches of the belts and forming a bottom to the stock-receiving channel therebetween, bifurcated yielding arms extending from opposite sides inwardly to the inner faces of the belts one on each side thereof, companion rotatable stock feed heads on axes inclined to the vertical yieldingly mounted to receive the stock therebetween and urge the same forwardly and downwardly in the channel, companion driven stock feed rolls on vertical axes yieldingly mounted to receive the stock therebetween and to forward the same to the machine to be fed, a fixed guide at the out-feeding end of the machine, yielding guide opposed to the fixed guide, a spring bearing on the yielding guide, and a quick-release comprising a furcated abutment for the spring capable of having the spring dislodged therefrom.

12. In a stock feeder for wood-working machines, a machine frame, longitudinally mounted shafting, driving connections therefor, sprocket pulleys on the shafting, chain belts traversing the pulleys with substantially vertical reaches, the belts arranged in pairs in transverse vertical planes, the adjacent reaches of each pair moving downwardly in substantially parallel relation and separated a suitable distance to receive the stock therebetween on edge, the upper pulley of one of the belts of a pair mounted to yield away from the corresponding upper belt pulley of the pair, a horizontal track disposed between the horizontal reaches of the belts and forming a bottom to the stock-receiving channel therebetween, forwarding means for frictionally engaging the stock while in the channel between the belts and urging the same forwardly, and a directing member at the discharge end of the machine.

13. In a stock feeder for wood-working machines, a machine frame, longitudinally mounted shafting, driving connections therefor, sprocket pulleys on the shafting, chain belts traversing the pulleys with substantially vertical reaches, the belts arranged in pairs in transverse vertical planes, the adjacent reaches of each pair moving downwardly in substantially parallel relation and separated a suitable distance to receive the stock therebetween on edge and forward the same through the channel, and means to receive the stock from the feed rolls and to direct the same into the machine to be fed.

14. In a stock feeder for wood-working machines, a machine frame, longitudinally mounted shafting, driving connections therefor, sprocket pulleys on the shafting, chain belts traversing the pulleys with substantially vertical reaches, the belts arranged in pairs in transverse vertical planes, the adjacent reaches of each pair moving downwardly in substantially parallel relation and separated a suitable distance to receive the stock therebetween on edge, a track disposed between the adjacent reaches of the belts and forming a bottom to the stock-receiving channel therebetween, companion spherical stock feed heads on axes inclined to the vertical one fixed and the other yieldingly mounted to receive the stock therebetween and urge the same forwardly and downwardly in the channel, companion feed rolls on vertical axes one fixed and the other yieldingly mounted to receive the stock therebetween and to forward the same from the stock feed heads, and means to receive the stock from the feed rolls and direct the same into the machine to be fed.

15. In a stock feeder for wood-working machines, a machine frame, longitudinally mounted shafting, driving connections therefor, sprocket pulleys on the shafting, chain belts traversing the pulleys with substantially vertical reaches, the belts arranged in pairs in transverse vertical planes, the adjacent reaches of each pair moving downwardly in substantially parallel relation and separated a suitable distance to receive the stock therebetween on edge, the upper pulley of one of the belts of a pair mounted to yield away from the corresponding upper belt pulley of the pair against adjustable resistance, a horizontal track disposed between the adjacent reaches of the belts and forming a bottom to the stock-receiving channel therebetween, bracket members substantially tangent to the top of the upper belt pulleys to facilitate delivery of stock over said pulleys to the channel, a deflector rail at the opposite side of the pulleys, a deflector plate at the forward end of the machine to position the stock endwise, yielding arms extending from opposite sides inwardly to the inner faces of the belts, companion spherical stock feed heads rotatably mounted on axes inclined to the vertical one fixed and the other yielding to receive the stock therebetween and urge the same forwardly and downwardly in the channel, companion stock feed rolls on vertical axes one fixed and the other yieldingly mounted to receive the stock therebetween and to forward the same to the machine to be fed, a directing and excluding plate disposed between the stock feed heads and stock feed rolls to direct the forward end of the stock downwardly between the stock feed rolls and to exclude material of too great height, a fixed guide at the out-feeding end of the machine, a yielding guide opposed to the fixed guide, and means for controlling the yielding guide and effecting a quick release thereof comprising a hand lever, a stop therefor, a spring, and a furcated abutment for the spring capable of having the spring quickly dislodged therefrom.

In testimony whereof I have hereunto signed my name in the presence of two subscribing witnesses.

CHARLES J. MARSHALL.

Witnesses:
L. C. FOSTER,
FRANK R. WEAVER.